(12) United States Patent
Gollier (10) Patent No.: US 8,678,599 B2
(45) Date of Patent: Mar. 25, 2014

(54) SYSTEMS AND METHODS FOR REDUCING SPECKLE USING DIFFUSING SURFACES

(75) Inventor: Jacques Gollier, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 369 days.

(21) Appl. No.: 13/112,042

(22) Filed: May 20, 2011

(65) Prior Publication Data

US 2011/0285967 A1 Nov. 24, 2011

Related U.S. Application Data

(60) Provisional application No. 61/346,956, filed on May 21, 2010.

(51) Int. Cl.
G03B 21/28 (2006.01)
G03B 21/26 (2006.01)
H04N 3/08 (2006.01)
G02B 5/02 (2006.01)
G02B 13/20 (2006.01)

(52) U.S. Cl.
USPC ............... 353/98; 353/94; 348/203; 359/599

(58) Field of Classification Search
USPC .................... 353/98, 99, 30, 31, 94; 359/599
See application file for complete search history.

(56) References Cited

U.S. PATENT DOCUMENTS

| 6,747,781 | B2 * | 6/2004 | Trisnadi ....................... 359/279 |
| 8,077,365 | B2 * | 12/2011 | Cable ............................... 359/9 |
| 8,313,197 | B2 * | 11/2012 | Lee et al. ....................... 353/28 |
| 2006/0092515 | A1 | 5/2006 | Kim et al. |
| 2007/0268458 | A1 | 11/2007 | Lee et al. |
| 2007/0296645 | A1 | 12/2007 | Lee et al. |
| 2008/0156401 | A1 | 7/2008 | Chattopadhyay et al. |
| 2008/0304128 | A1 | 12/2008 | Busker et al. |
| 2010/0002280 | A1 * | 1/2010 | Violonchi ..................... 359/238 |
| 2010/0020291 | A1 | 1/2010 | Kasazumi et al. |
| 2010/0067088 | A1 | 3/2010 | Novotny et al. |
| 2010/0110389 | A1 * | 5/2010 | Liao et al. ....................... 353/31 |

FOREIGN PATENT DOCUMENTS

WO 2009/040822 4/2009

OTHER PUBLICATIONS

Trisnadi; "Speckle contrast reduction in laser projection displays", Annual Meeting of the Optical Society of America; Optics in The New Millennium, Providence, RI, Oct. 22-25, 2000, Jan. 1, 2000, pp. 1-7.

* cited by examiner

*Primary Examiner* — William C Dowling
*Assistant Examiner* — Ryan Howard
(74) *Attorney, Agent, or Firm* — Joseph M. Homa (57) ABSTRACT

A laser projection system includes a light source, an optical scanning component, a focusing component, a speckle reduction diffusing surface, and an optical collimating component. The light source may include at least one laser configured to emit an output beam. The focusing component focuses the output beam at a first focused point. The speckle reduction diffusing surface is selectively introduced into an optical path at the first focused point. The optical collimating component collimates the output beam onto the optical scanning component. At least a portion of a scanned laser image is generated on a projection surface by operating the laser for optical emission of encoded image data and controlling the optical scanning component to scan the output beam. The optical collimating component images the first focused point at a second focused point at the projection surface when the speckle reduction diffusing surface is in the optical path.

23 Claims, 5 Drawing Sheets

SYSTEMS AND METHODS FOR REDUCING SPECKLE USING DIFFUSING SURFACES

CROSS REFERENCE TO RELATED APPLICATIONS

This application claims the benefit of priority under 35 U.S.C. §119 of U.S. Provisional Application Ser. No. 61/346,956, filed on May 21, 2010, the content of which is relied upon and incorporated herein by reference in its entirety.

BACKGROUND

1. Field

Embodiments of the present disclosure relate to laser projection systems and, more specifically, to laser projection systems that reduce the appearance of speckle in a scanned laser image.

2. Technical Background

Speckle may result whenever a coherent light source is used to illuminate a rough surface, for example, a screen, wall, or any other object that produces a diffused reflection or transmission. Particularly, a multitude of small areas of the screen or other reflecting objects scatter light into a multitude of diffracted beams with different points of origination and different propagation directions. Speckle causes high spatial frequency noise in the projected image. At an observation point, for example in the eyes of an observer or at the sensor of a camera, these beams interfere constructively to form a bright spot, or destructively to form a dark spot, producing a random granular intensity pattern known as speckle. Speckle may be characterized by grain size and contrast, usually defined as a ratio of standard deviation to mean light intensity in the observation plane. For a large enough illuminated area and a small enough individual scattering point size, the speckle will be "fully developed," with a brightness standard deviation of 100% if the diffuser is not depolarizing light and of about 71% when the diffuser is depolarizing light. If an image is formed on the screen using a coherent light source such as laser beams, such granular structure will represent noise or a serious degradation of the image quality. This noise presents a significant problem, particularly when the projector is used to display high spatial frequency content, such as text.

Speckle may be reduced by inserting some moving diffusing surfaces into the optical path of the scanned laser beam to scramble the phase of the light hitting the screen. The moving diffusing surface modifies the shape of the speckle pattern as a function of time and, if the diffusing surface is moving fast enough, all those speckle patterns are averaged since humans integrate images typically over durations in the order of 50 ms.

Although rapidly moving the diffuser provides speckle reduction, it requires expensive and complicated mechanisms to move the phase mask laterally at a relatively high speed. Further, a moving diffuser requires the use of focus mechanisms as well as lenses possessing a high numerical aperture and a high field of view, which adds significant complexity, cost and size to the system. Therefore, the use of a moving diffuser presents some significant drawbacks when implementing such approaches in small size projectors.

BRIEF SUMMARY

In one embodiment, a laser projection system includes a light source, an optical scanning component, a focusing component, a speckle reduction diffusing surface, and an optical collimating component. The light source may include at least one laser configured to emit an output beam. The focusing component is positioned in an optical path of the output beam emitted by the light source and focuses the output beam at a first focused point located prior to the optical scanning component. The speckle reduction diffusing surface is operable to be selectively introduced into the optical path of the output beam at the first focused point prior to the optical scanning component. The optical collimating component is positioned in the optical path of the output beam after the focusing component and is operable to at least nearly collimate the output beam onto the optical scanning component. The laser projection system is programmed to generate at least a portion of a scanned laser image on a projection surface by operating the laser for optical emission of encoded image data and controlling the optical scanning component to scan the output beam across a plurality of image pixels. The optical collimating component is configured such that the first focused point is imaged at a second focused point at the projection surface when the speckle reduction diffusing surface is introduced into the optical path of the output beam.

In another embodiment, a laser projection system includes a light source, an optical scanning component, a focusing component, a speckle reduction diffusing surface, and an optical collimating component. The light source comprises at least one laser configured to emit an output beam. The focusing component is positioned in an optical path of the output beam emitted by the light source and focuses the output beam at a first focused point located prior to the optical scanning component. The optical collimating component is positioned in the optical path of the output beam after the focusing component and is operable to at least nearly collimate the output beam onto the optical scanning component. The speckle reduction diffusing surface is operable to be introduced into the optical path of the output beam at the first focused point prior to the optical scanning component during a speckle reduction mode of operation, and operable to be removed from the optical path of the output beam during an infinite depth of focus mode of operation. The speckle reduction diffusing surface is orientated at a focusing angle with respect an axis that is perpendicular to an optical axis defined by the optical path of the output beam and produces a diffusing angle of the output beam such that the output beam has a diameter between about 1.5 mm to about 4 mm on the optical scanning device when the speckle reduction diffusing surface is introduced into the optical path of the output beam. The focusing component and the optical collimating component are configured such that a diameter of the output beam on the optical scanning device is between about 0.4 mm to about 1 mm when the speckle reduction diffusing surface is not introduced into the optical path of the output beam. The laser projection system is programmed to generate at least a portion of a scanned laser image on a projection surface by operating the laser for optical emission of encoded image data and controlling the optical scanning component to scan the output beam across a plurality of image pixels, and translate the speckle reduction diffusing surface in a direction along the first axis such that the first focused point is imaged at the second focused point at the projection surface.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
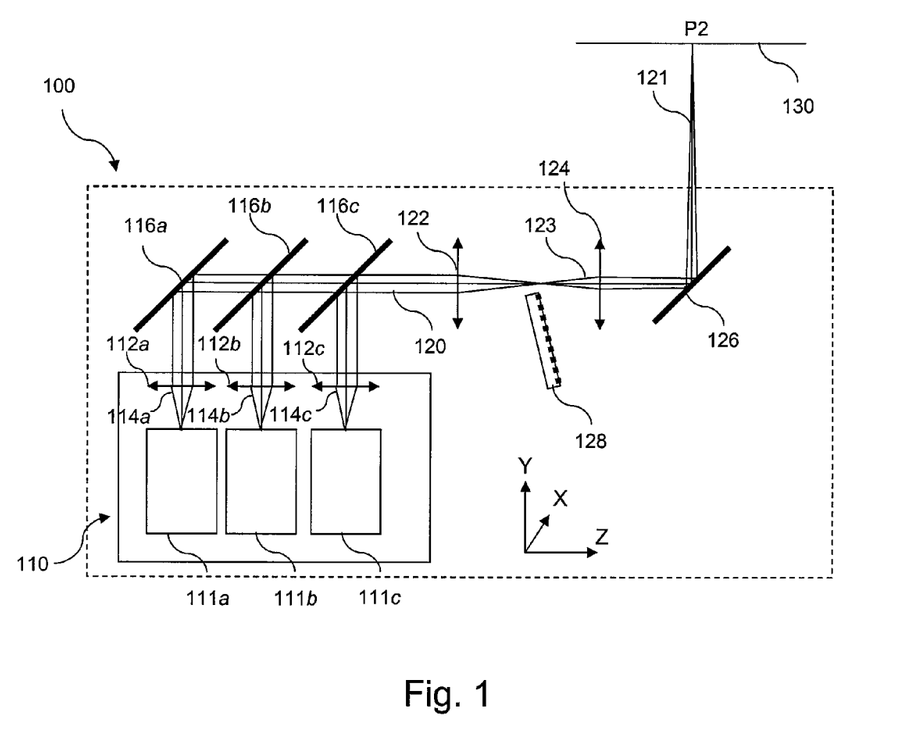
FIG. 1 depicts a schematic illustration of a laser projection system operating in an infinite depth of focus mode according to one or more embodiments.
Figure 2:
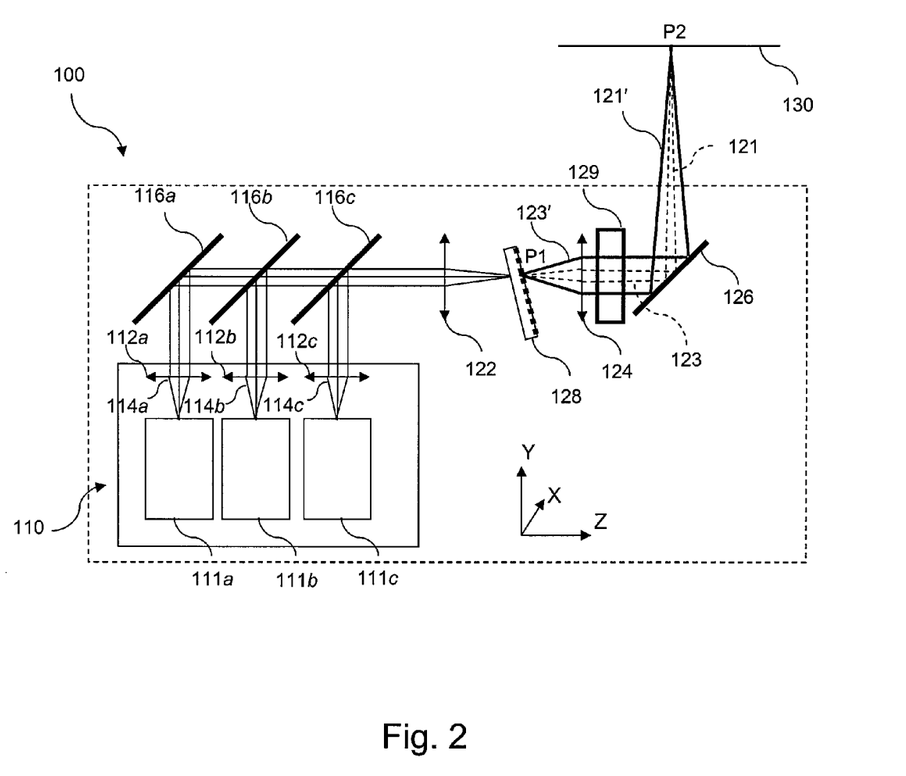
FIG. 2 depicts a schematic illustration of a laser projection system operating in a speckle reduction mode according to one or more embodiments.

Particular embodiments of the present disclosure may be described in the context of a laser projection system that scans an output beam across a projection surface to generate a two-dimensional image. However, embodiments may be implemented in not only laser projection systems, but other optical systems utilizing coherent light sources in conjunction with scanning mechanisms where the reduction of speckle is desired. Generally, as illustrated in FIGS. 1 and 2, the appearance of speckle in the scanned laser image may be reduced by providing high spatial frequency modulation of the phase of the electric field incident on the projection surface (e.g., a screen) and modifying the shape of the phase modulation as a function of time to produce many different speckle patterns over the integration time of the human eye. The eye averages the many different speckle patterns and the appearance of speckle is thereby attenuated. Embodiments described herein reduce speckle by introducing a speckle reduction diffusing surface along an optical path of an output beam produced by a coherent light source. The speckle reduction diffusing surface is positioned prior to an optical scanning component that two dimensionally scans the output beam.

Referring now to FIG. 1, a schematic illustration of one embodiment of a laser projection system 100 is illustrated. The exemplary laser projection system 100 is configured as a scanning laser projection system that is programmed to two-dimensionally scan an output beam 120 generated by a light source 110 and reflected (or transmitted) by an optical scanning component 126 to create a two-dimensional image at a given projection surface 130, such as a wall or a projector screen, for example. As described in more detail below, some embodiments may comprise a polarization scrambling device 129. The laser projection system 100 may be used to display static images (e.g., text), moving images (e.g., video), or both. The system may be compact such that it may be incorporated into a relatively small device, such as a hand-held projector, cell phone, personal data assistant, notebook computer or other similar devices.

The light source 110 may comprise one or more lasers. The embodiment illustrated in FIGS. 1 and 2 comprises three lasers 111a, 111b and 111c that are operable to emit coherent beams at different wavelengths. Mirrors and dichroic mirrors can be used, as an example, to combine the three emitted beams 114a, 114b and 114c into one single emitted beam 120. For example, the light source 110 may comprise three lasers capable of emitting beams of red, blue and green wavelengths, respectively. According to some embodiments, the output beam 120 consists of nearly collimated green, red and blue beams. For example, the first laser 111a may emit a beam 114a having a wavelength in the green spectral range, the second laser 111b may emit a beam 114b having a wavelength in the red spectral range, and the third laser 111c may emit a beam 114c having a wavelength in the blue spectral range. Other embodiments may utilize a light source 110 that emits more or fewer collimated laser beams, and/or beams at wavelengths other than green, red or blue. For example, output beam 120 may be a single output beam having a wavelength in the green spectral range.

The light source 110 may comprise one or more single-wavelength lasers, such as distributed feedback (DFB) lasers, distributed Bragg reflector (DBR) lasers, vertical cavity surface-emitting lasers (VCSEL), diode pumped solid state lasers (DPSS), native green lasers, vertical external cavity surface-emitting lasers (VECSEL) or Fabry-Perot lasers, for example. Additionally, to generate a green beam, the light source 110 of some embodiments may also comprise a wavelength conversion device (not shown) such as a second harmonic generating (SHG) crystal or a higher harmonic generating crystal to frequency-double a laser beam having a native wavelength in the infrared band. For example, a SHG crystal, such as an MgO-doped periodically poled lithium niobate (PPLN) crystal, may be used to generate green light by converting the wavelength of a 1060 nm DBR or DFB laser to 530 nm. The light source 110 may also comprise lasers other than single wavelength lasers, such as lasers capable of emission of multiple wavelengths. In other embodiments, the light source 110 may comprise a laser capable of emitting a native green laser without the use of a wavelength conversion device.

The light source 110 may also comprise light source lenses 112a-112c positioned in an optical path of each beam produced by the lasers 111a-111c. The light source lenses may provide nearly collimated beams 114a-114c that exit the light source 110. In other embodiments, the light source 110 may not comprise a light source lens and the beam or beams may exit the light source 110 in a non-collimated state. In one embodiment, the laser projection system 100 further comprises reflective surfaces 116a-116c that are positioned and configured to reflect and combine the three beams 114a-114c produced by the lasers 111a-111c into an output beam 120. The output beam 120 may be a single beam comprising laser beams 114a-114c, or it may be three beams comprising laser beams 114a-114c. For example, the laser beams 114a-114c may be spatially separated and not combined into a single output beam 120, as described in more detail below. In embodiments that utilize only one laser, the laser projection system 100 may not utilize a reflective surface. Further, it should be understood that other beam combiner devices may be utilized.

The laser projection system 100 may be programmed to perform many of the control functions disclosed herein. The system 100 may be programmed in numerous ways, including conventional or yet-to-be-developed programming methods. Methods of programming the system 100 discussed herein are not intended to limit the embodiments to any specific way of programming.

In some embodiments, the laser projection system 100 may include one or more system controllers (not shown), such as microcontrollers, for example, that are programmed to control the light source 110 to generate a single or multi-color image data stream. The system controller, along with image projection software and associated electronics known in the art, may provide the light source with one or more image data signals (e.g., laser drive currents) that carry image data. To create the desired image, the light source 110 may then emit the encoded image data in the form of gain or intensity variations of the output beam 120. However, some embodiments may utilize other controller or programming means to generate the scanned laser image.

A focusing optical component 122 may be positioned in an optical path of the output beam 120 such that the output beam 120 first passes through the focusing optical component 122. As described in more detail below, a speckle reduction diffusing surface 128 may be selectively introduced into the optical path of the output beam 120 after the focusing optical component and before the optical scanning component 126. The focusing optical component 122 has a focal length that produces a first focused point of the output beam 120 (i.e., either a single output beam of beams 114a-114c, or three focused points) at a location P1 inside of the laser projection system 100. The light 123 provided by the output beam 120 originating from P1 is then re-imaged on a second focus point at location P2 on the projection surface 130 via a collimating component 124 and the optical scanning component 126 as converging beam 121. When the diffusing surface is inserted into the optical path, it should preferably be located at the proximity of the first focused point P1.

The optical scanning component 126 is positioned in the optical path of the output beam 120 after the focusing component 122. The optical scanning component 126 may comprise one or more controllable and movable micro-opto-electromechanical systems (MOEMS) or micro-electromechanical systems (MEMS) configured to two-dimensionally scan the output beam 120 toward the projection surface 130 to illuminate a plurality of pixels forming an image frame at an image frame rate. Other scanning components such as spinning polygons, resonant mirrors or galvanometric mirrors may also be used. The scanned output beam is illustrated as converging output beam 121 in FIGS. 1 and 2. Successive image frames make up the scanned laser image. It is also contemplated that the MOEMS or MEMS be operatively coupled to a mirror or a prism that is configured to redirect the output beam 120 accordingly. The focusing component 122 focuses the output beam 120 onto the optical scanning component 126.

FIG. 1 illustrates the system 100 operating in an infinite depth of focus mode (i.e., a non-speckle reduction mode). The optical properties of the focusing optical component 122 and the collimating component 124 are such that that the convergence angle of the converging output beam 121 hitting the projection surface is small enough so that images appearing on the projection surface remain sharp independently of the projection distance and without requiring any focus adjustment inside of the laser projector system 100. Further, the optical properties of the focusing optical component 122 and the collimating component 124 are such that the beam spot size on the projection surface 130 is small enough to satisfy an image resolution requirement. Typically the beam spot size on the projection surface 130 should be approximately the same size as the image pixel size. As illustrated in FIG. 1, when operating in the infinite depth of focus mode, the speckle reduction diffusing surface 128 is not introduced into the optical path of the output beam 120. When the laser projection system 100 is operated in the infinite depth of focus mode, the depth of focus is very large and therefore there is no need for focus adjustments to achieve a focused scanned laser image on the projection surface 130. To meet that condition, the convergence angle of the converging output beam 121 should be relatively small, thereby resulting in a relatively small beam diameter of the beam on the optical scanning component 126. However, the consequence of the small convergence angle is that there is not much speckle reduction.

FIG. 2 illustrates the laser projection system 100 operating in a speckle reduction mode. As illustrated in FIG. 2, the speckle reduction diffusing surface 128 is introduced into the optical path of the focused output beam 120 at a location that is proximate to the location of the first focused point P1. The speckle reduction diffusing surface 128 may be mechanically moved into and out of the optical path by an actuator, for example. Light 123' originating from the first focused point at location P1 after having been transmitted by the speckle reduction diffusing surface 128 is re-imaged on a second focused point at location P2 on the projection surface 130 (i.e., the projection screen) via the collimating component 124 and the optical scanning component 126. The converging output beam 121' illuminates the second focused point at location P2. Since the first focused point is imaged at the second focused point at location P2 on the projection surface, the amplitude profile of the converging output beam 121 on the projection surface 130 is not significantly modified, meaning that the beam spot size has not changed with respect to the previous projector configuration described and illustrated in FIG. 1. In other words, because the speckle reduction diffusing surface 128 is positioned prior to the optical scanning component 126 and is located close to the first focused point P1 which is re-imaged on at second focused point location P2 on the projection surface 130, the introduction of the speckle reduction diffusing surface 128 does not affect the sharpness image on the projection surface 130. Now, since the speckle reduction diffusing surface 128 is imaged on the projection surface 130, some high spatial frequency modulation of the phase of the electric filed is added to the beam spot on the projection surface 130. As the optical scanning component 126 scans the converging output beam 121', a position of the phase modulation provided by the speckle reduction diffusing surface 128 follows the output beam as it is rapidly scanned by the optical scanning component 126, thereby resulting in rapidly moving the phase modulation with respect to the projection surface 130. The consequence is that the appearance of speckle to an observer is reduced.

FIG. 2 also illustrates that the divergence of the output beam originated from the location of the first focused point P1 increases with the insertion of the speckle reduction diffusing surface 128, which causes the convergence angle of the converging output beam 121' to correspondingly increase. Therefore, depending on the convergence angle, it may not be possible to maintain sharp images independently of the distance from the laser projection system 100 to the projection surface 130. Accordingly, depending on the convergence angle, a focusing mechanism or mechanisms may be utilized to ensure that the converging output beam 121' is focused at the projection surface 130. In one embodiment, the collimating component 124 may be translated along the Z-axis to properly image the speckle reduction diffusing surface 128 on the projection surface 130 for many projection distances. In another embodiment, the speckle reduction diffusing surface 128 may be tilted about the X-axis such that the speckle reduction diffusing surface 128 is angled with respect to the Y-axis. Focus adjustments may be provided by translating the speckle reduction diffusing surface 128 along the Y-axis. Due to the tilt of the speckle reduction diffusing surface 128, a motion along the Y-axis results in moving the active surface of the speckle reduction diffusing surface 128 (i.e., the portion of the speckle reduction diffusing surface 128 of which the output beam is illuminating) along the Z-axis, which is equivalent to varying the focus of the laser projection system

100. It should be understood that the various axes described herein are for illustrative purposes only and no particular limitations as to orientation are intended.

The parameters of the laser projection system should be optimized to achieve the proper image resolution as well as the infinite depth of focus in the non-speckle reduction mode illustrated in FIG. 1 and the desired speckle reduction in the speckle reduction mode illustrated in FIG. 2. The infinite depth of focus may be analyzed by assuming that lasers beams are nearly Gaussian and propagate to the projection surface 130 according to conventional Gaussian beam propagation laws. To illustrate how to achieve the infinite depth of focus, assume a case where the image resolution in one direction is 800 pixels along one direction of the image (i.e., an image line of the scanned laser image comprises 800 pixels) and the deflection angle of the scanning device is 40 degrees in that same direction. In first approximation, the image pixel size on the projection surface may be given by:

$$\text{Pixel}=2*D*tg(\theta/2)/R, \quad \text{Eq. (1)},$$

where:
Pixel is the pixel size,
D is the projection distance,
$\theta$ is the projection angle of the laser projection system (40 degrees), and
R is the native resolution of the laser projection system in one direction (800 pixels).

Since the pixel size is equal to 0.9E-3 times the projection distance, an angle of 0.9 mRd may be associated with the pixel, which is called the angular extend of the pixel. To achieve the resolution of 800 pixels, it may be shown that the beam spot size on the projection surface illuminated by the collimating output beam (full width at half maximum (FWHM)) should be roughly equal to the image pixel size to obtain the highest resolution over the widest range of projection distances D. The Gaussian beam propagation rules may then be applied to calculate the beam spot size as a function of the projection distance D.

Figure 3:
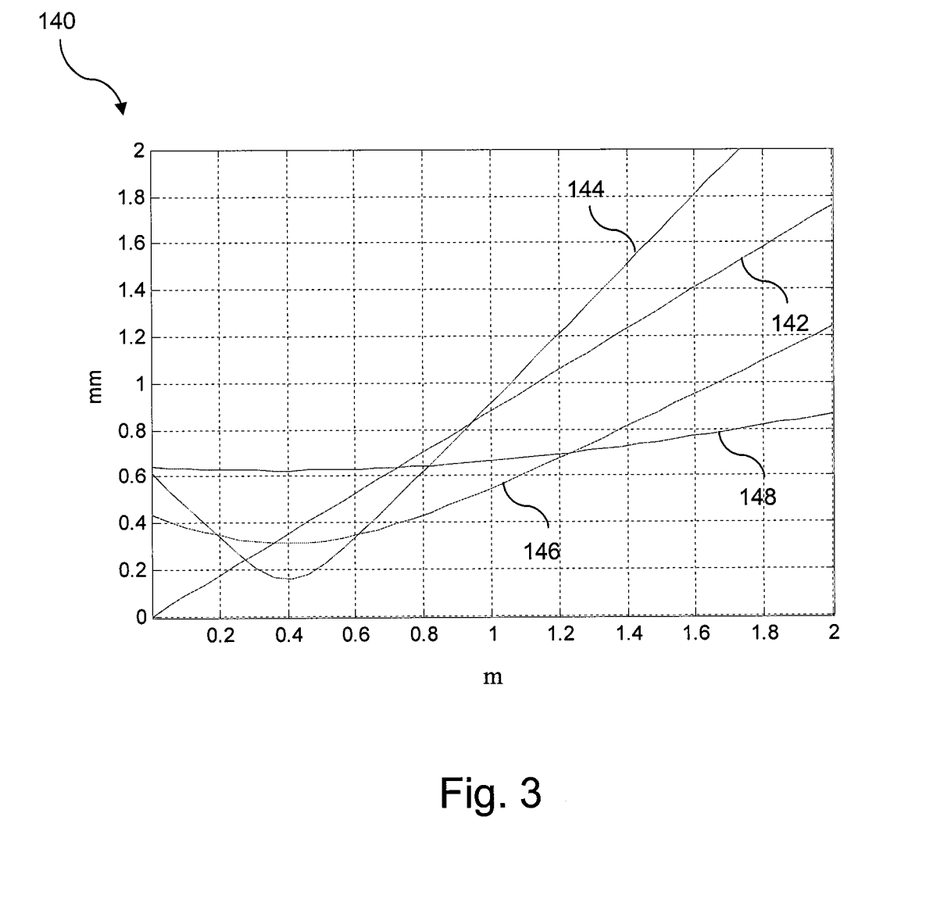
FIG. 3 depicts a graph of the surface beam spot size full-width at half-maximum and pixel size on a projection surface versus projection distance D according to one or more embodiments.

FIG. 4 illustrates a graph 140 that depicts the size of the surface beam spot FWHM and the pixel size (y-axis) versus projection distance D (x-axis). Curve 142 represents the size of the image pixels as a function of projection distance D. Curve 144 shows the surface beam spot size assuming that the optical components described above have been configured to create a very small beam 0.4 meters away from the laser projection system. As can be seen from the graph 140, the surface beam spot size expands faster than the pixel size and, after about a meter, the beam becomes bigger than the image pixels resulting in a degradation of the image resolution. For the case depicted by curve 148, the beam convergence is set much lower resulting in creating a larger beam size 400 mm away from the laser projection system. In this case, the proper image resolution is only achieved for distances larger than 0.7 meters. Curve 146 is closer to the ideal situation where the convergence angle of the Gaussian beam is set to be equal to the pixel angular extend. As illustrated in the graph 140, the case where the convergence angle of the Gaussian beam is set to be equal to the pixel angular extend provides the widest range of the projection distances where the image resolution is achieved (i.e., where the surface beam spot size is smaller than the image pixel size). In the numeric example described above, this corresponds to a beam diameter on the optical scanning component in the order of 0.4 to 0.5 mm (FWHM).

It may be shown that the level of speckle reduction that may be achieved depends on many parameters. The present inventor has recognized that speckle attenuation may be achieved using an output beam diameter of less than 6 mm incident on the optical scanning component (i.e., MEMS scanning mirror) when the projection surface is a bulk scattering surface. A bulk scattering projection surface is a projection surface in which light penetrates into the material of the projection surface and spreads over some distance rather than being scattered on the surface. Bulk scattering projection surface materials may include, but are not limited to, paper, painted surfaces, cardboard and fabric. When using such types of screen materials, the present inventor recognizes that speckle can be significantly decreased without requiring to use very large sizes for the scanning component. Because the output beam diameter on the optical scanning component is relatively smaller, the optical scanning component may rotate fast enough to generate the scanned laser image and the depth of focus may be improved.

To quantify the effect of beam size on the optical scanning component on speckle contrast with real projector materials, an experimental set-up was constructed consisting of a large, slow MEMS scanning mirror. The following example is intended for illustrative purposes only and not as a limitation. The speckle was measured as a function of output beam diameter incident on the MEMS scanning mirror. Assume that the projection distance D is set to 0.5 m, the observer to the projection surface is also set to 0.5 m, and the observer eye pupil diameter is 6 mm in dark room illumination conditions. The MEMS scanning mirror had a diameter of 3.6×3.2 mm, and the frame rate was 1 Hz and therefore made the images invisible to the human eye. The resulting scanned images were measured with an eye simulator having an integration time set a one second and a light collection angle of 12 mRd (e.g., similar to a 6 mm eye pupil located 0.5 meters away from the screen). The distance between the image lines was smaller than the surface beam spot so the image lines completely overlapped. The size of the beam on the MEMS scanning mirror was varied by the use of a liquid lens and a collimating lens of the laser light source, and was measured with a CCD camera. Theoretical results were also derived using a model consisting of creating a Gaussian beam spot on the projection surface and calculating a speckle pattern for each position of the Gaussian beam spot on the projection surface. The final image of the model was obtained by summing the intensity of the images calculated as a function of the Gaussian beam spot position. The inter line distance between image lines was set equal to the Gaussian beam FWHM. The model assumed that the project surface was a surface scattering material having a random rough surface with a roughness depth in the order of the wavelength of the beam.

Figure 4:
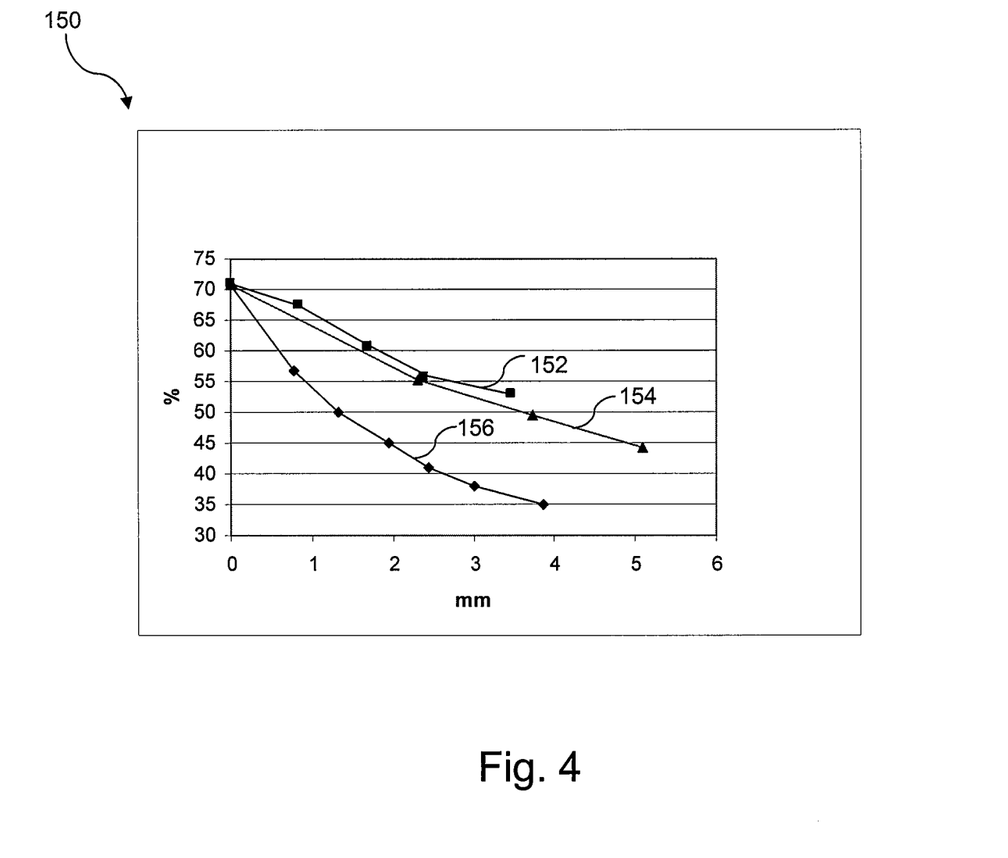
FIG. 4 depicts a graph of speckle contrast versus $1/e^2$ output beam diameter according to one or more embodiments.

FIG. 4 illustrates a graph 150 that plots the experimental data resulting from the above experimental set-up using a rough metal screen (curve 152) as the surface scatting projection surface and a paper screen (curve 156) as the bulk scattering projection surface. The y-axis is the speckle contrast while the x-axis is the $1/e^2$ beam diameter of the output beam on the MEMS scanning mirror. $1/e^2$ beam diameter is the distance between two points on the marginal distribution that are $1/e^2=0.135$ times the maximum intensity value. Curve 154 illustrates the theoretical results derived from the speckle contrast theory model. The rough metal screen follows closely to the model prediction which indicates that the model and the experimental set-up describe above were valid. It should be noted that the curve 154 has been corrected to take into consideration the fact that the metallic surface used to measure curve 154 did not depolarize light. Experimental data for curve 154 have then been devised by $\sqrt{2}$ to enable a fair comparison with curve 156 where the projection surface was depolarizing the light. As shown in the graph 150, the speckle measured on the paper screen decreases much faster than the theoretical predictions (curve 154) and the rough metal screen (curve 152). The paper screen reaches about 42% speckle contrast with a $1/e^2$ beam diameter of about 2.2 mm on the MEMS scanning mirror. Conversely, the rough metal screen data did not approach 40% speckle contrast. By extrapolating curve 172, 40% speckle contrast may be achieved with a $1/e^2$ beam diameter greater than 6 mm. Therefore, a much smaller optical scanning component 126 may be utilized to achieve effective speckle contrast attenuation when projecting the scanned laser image on a bulk scattering projection surface. For example, the optical scanning component 126 may be slightly larger in diameter than the output beam diameter. In the above experiment, a optical scanning component having a diameter greater than 2.2 mm may be used to scan the image. However, the diameter should not be so large as to slow the rotation of the optical scanning component. A smaller diameter (e.g., between about 2.2 mm and about 3.5 mm, for example) may enable the MEMS-actuated mirror of the smaller optical scanning component 128 to rotate at the image frame rate (e.g., greater than 20 Hz) without falling behind the image frame rate.

Accordingly, with most existing projection surface materials, relatively low speckle amplitude such as 37% may be achieved with reasonable optical scanning component diameters such as 3.5 mm, for example. However, a speckle amplitude of 37% may not be low enough to remove the appearance of speckle to an observer, embodiments described herein may be used in conjunction with other speckle reduction techniques, such as spectral widening and/or polarization scrambling, for example.

As an example and not a limitation to illustrate how the laser projection system may be configured to meet both conditions of infinite depth of focus in the non-speckle reduction mode and speckle reduction in the speckle reduction mode, assume that one of the lasers (e.g., laser 111a) of the light source 110 is emitting a single-mode Gaussian beam with 8 degrees divergence at FWHM. The focal length of the laser collimating component 124 may be 2 mm as to produce a 0.28 mm FWHM collimated beam 121. The two other lens (122 and 124) focal length could be respectively 4 mm and 7 mm as to create a beam diameter around 0.5 mm (FWHM) on the scanning mirror and meet the infinite depth of focus condition when the speckle reduction diffusing surface 128 is not inserted in the optical path. Also, the focus of the collimating component 124 is adjusted to image the beam waist of the beam P1 at a nominal screen distance of around 400 mm.

When the speckle reduction diffusing surface 128 is inserted in the optical path, the diameter of the beam on the speckle reduction diffusing surface is directly related to the angle of diffusion of the speckle reduction diffusing surface:

$$\sin(\theta/2) = \Phi_{MEMS}/2/f_2, \quad \text{Eq (2),}$$

where:

θ is the angle of diffusion of the speckle reduction diffusing surface, $\Phi_{MEMS}$ is the diameter of the output beam on the scanning component, and $F_2$ is the focal length of the collimating lens.

In the numeric example provided above, $f_2$ is about 7 mm. Thus, to get a beam diameter of 3.5 mm corresponding to a speckle amplitude of 37%, the angle of diffusion of the speckle reduction diffusing surface 128 about be in the order of 33 about degrees (full angle). The diameter of the optical scanning component should be at least 3.5 mm to avoid beam vignetting.

In one embodiment, the speckle reduction diffusing surface 128 creates an homogeneous angular energy distribution within the desired diffusion angle (e.g., 33 degrees illustrated in the example above). In another embodiment, the speckle reduction diffusing surface 128 may be configured in such a way that the output beam profile comprises a grid of many points. This may be achieved, for example, by the use of at least one holographic beam splitter. In yet another embodiment, the angular energy distribution emitted by the speckle reduction diffusing surface 128 may be a ring-like shape. The speckle reduction diffusing surface 128 may be obtained by using holographic diffusers or computer generated holograms. The speckle reduction diffusing surface 128 should be configured such that the diffraction efficiency is as high as possible (e.g., greater 90%) and most of the energy (e.g., greater than 90%) is diffracted in the first order of diffraction so that the energy is not wasted in parasitic orders of diffraction. To achieve high diffraction efficiencies, the speckle reduction diffusing surface 128 may be set at a specific angle with respect to the incident beam called the Bragg angle. Also, the speckle reduction diffusing surface 128 can be a transmissive component as shown on FIGS. 1 and 2, or also may be configured as a reflective diffusing component.

Figure 5:
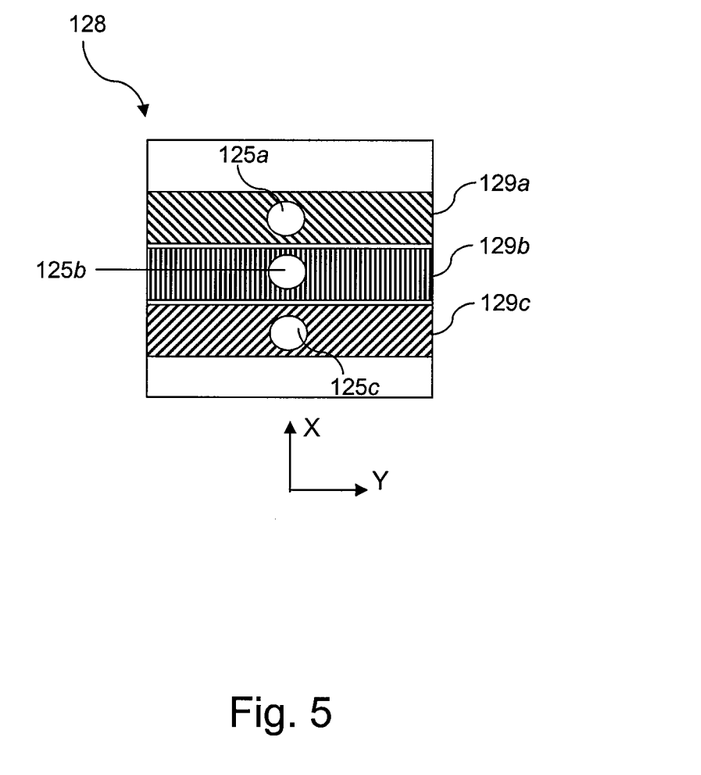
FIG. 5 depicts a schematic illustration of a speckle reduction diffusing surface and three focused points of an output beam according to one or more embodiments.

The inventor has recognized that, in embodiments wherein the light source 110 includes multiple color lasers (e.g., lasers 111a-111c), it may be difficult for the speckle reduction diffusing surface 128 to meet all requirements at the same time for all colors because parameters such as diffusion angle, diffraction efficiency and Bragg angle are function of the laser beam wavelength. In one embodiment, the laser beams 114a-114c are angularly separated within the output beam 120 resulting in spatially separating the beams at the level of P1 located close to the focal plane of the focusing component. Referring to FIG. 5, the laser beams are illustrated on an exit portion of the speckle reduction diffusing surface 128. The laser beams are focused by the focusing component 122 to produce three different focused points 125a, 125b and 125c at the speckle reduction diffusing surface 128 separated along the X-axis. The speckle reduction diffusing surface 128 illustrated in FIG. 5 comprises three spatially separated regions 129a, 129b and 129c. The diffusion property of each of the spatially separated regions 129a-129c may be optimized for the wavelength of the corresponding laser beam associated with focused points 125a-125c. For wavelengths of particular colors, speckle contrast may not be a significant problem. Speckle in the blue color, for example, is usually invisible to an observer so the region associated with the blue laser beam (e.g., spatially separated region 129b) may be transparent with no or little diffusion.

The spatial separation of the laser beams may be accomplished by, for example, moving the light source lenses 112a-112c in the X axis direction so that the beams of the nearly collimated output beam 120 are not exactly pointing in the same directions. The spatial separation may also be accomplished by slightly misaligning the angle of reflection of the reflective surfaces 116a-116c. However, because the focused points 125a-125c are re-imaged on the projection surface, the three colors also will be spatially separated on the projection surface, which may lead to image resolution issues. To compensate for the spatial separation of the beam spots on the projection surface, the laser projection system may be programmed to introduce a time delay to the lasers 114a-114c such that the beam spots illuminate the same region to produce the desired pixels as the output beam 120 is scanned by the optical scanning component 126.

Further, the typical perception level under which observers consider that the image quality is acceptable despite the appearance of speckle is around 20% to 30% speckle contrast. To achieve 20% to 30% speckle contrast, a very large optical scanning component may be needed, which may not be practical. Therefore, it may be desirable to utilize the embodiments described herein in conjunction with other speckle reduction techniques such as polarization scrambling devices that modulate the polarization state of the output beam. Referring once again to FIG. 2, embodiments of the laser projection system 100 may also include a polarization scrambling device 129 positioned in an optical path of the output beam after the speckle reduction diffusing surface 128. As an example, a polarization split and delay unit as described in U.S. Pat. No. 7,653,097, which is herein incorporated by reference in its entirety, may be used for polarization modulation to rotate the polarization of the output beam at a speckle reduction frequency (e.g., at the image frame rate). The polarization split and delay unit may be positioned in the optical path after the collimating component 124 and before the optical scanning component 126.

In another embodiment, the polarization scrambling device 129 may comprise a polarization modulator such as, for example, a liquid crystal single cell that may be inserted into the optical path of the output beam. The polarization modulator may then be modulated in such a way that the polarization of the laser beams switches between two orthogonal polarization states (such as S and P linear polarizations or circular left and circular right). The frequency of the polarization rotation can be set, for example, such that polarization switches from one state to the other one at the end of each projected image frame.

Spectral broadening of the output beam may also be utilized to achieve speckle contrast reduction. For example, an output beam in the green spectral range may have a spectral width of greater than about 0.5 nm wavelength to effectively reduce speckle. Spectral broadening and/or polarization scrambling may be utilized in conjunction with the diffuser embodiments described above to reduce the level of speckle contrast below 30%.

As an example and not a limitation, a speckle contrast level in the order of 25% may be achieved by illuminating a 3.5 mm output beam diameter incident on the optical scanning component with a speckle reduction diffusing surface in conjunction with polarization scrambling. As another example, a 1.5 mm output beam diameter may be illuminated on the on the optical scanning component with a speckle reduction diffusing surface in conjunction with polarization scrambling and an output beam spectral width of at least 0.6 nm for a green output beam.

The present inventor also recognizes that, according to the laser classification rules, increasing the beam diameter on the optical scanning component allows class 2 lasers to emit more power. As an example, a laser scanning projector having a beam diameter of 1 mm optical scanning component may be limited to a brightness of 10 Lumens to be classified as a class 2 laser. By increasing the beam diameter to 3 mm, the projector can, for example, emit three times more power and still be a class 2 laser. Therefore, the laser scanning projector may be configured such that, when operating the projector in the speckle reduced mode, the lasers are driven at higher current as to generate a brighter image that is still compatible with the laser classification rules.

For the purposes of describing and defining embodiments of the present disclosure it is noted that the term "substantially" is utilized to represent the inherent degree of uncertainty that may be attributed to any quantitative comparison, value, measurement, or other representation.

It is noted that recitations herein of a component of a particular embodiment being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

While particular embodiments have been illustrated and described herein, it should be understood that various other changes and modifications may be made without departing from the spirit and scope of the claimed subject matter. More specifically, although some aspects of the embodiments described are identified herein as preferred or particularly advantageous, it is contemplated that the claimed subject matter is not necessarily limited to these preferred aspects.

What is claimed is:

1. A laser projection system comprising a light source, an optical scanning component, a focusing component, a speckle reduction diffusing surface, and an optical collimating component, wherein:

the light source comprises at least one laser configured to emit an output beam;

the focusing component is positioned in an optical path of the output beam emitted by the light source and focuses the output beam at a first focused point located prior to the optical scanning component;

the speckle reduction diffusing surface is operable to be selectively introduced into the optical path of the output beam at the first focused point prior to the optical scanning component;

the optical collimating component is positioned in the optical path of the output beam after the focusing component and is operable to at least nearly collimate the output beam onto the optical scanning component;

the laser projection system is programmed to generate at least a portion of a scanned laser image on a projection surface by operating the laser for optical emission of encoded image data and controlling the optical scanning component to scan the output beam across a plurality of image pixels;

the optical collimating component is configured such that the first focused point is imaged at a second focused point at the projection surface when the speckle reduction diffusing surface is introduced into the optical path of the output beam; and the laser projection system operates in an infinite depth of focus mode when the speckle reduction diffusing surface is not introduced into the optical path of the output beam.

2. The laser projection system of claim 1, wherein the focusing component and the optical collimating component are configured such that a diameter of the output beam on the optical scanning component is between about 0.4 mm to about 1 mm when the speckle reduction diffusing surface is not introduced into the optical path of the output beam.

3. The laser projection system of claim 1, wherein the laser projection system operates in a speckle reduction mode when the speckle reduction diffusing surface is introduced into the optical path of the output beam.

4. The laser projection system of claim 3, wherein the speckle reduction diffusing surface produces a diffusing angle of the output beam such that the output beam has a diameter between about 1.5 mm to about 4 mm on the optical scanning component when the speckle reduction diffusing surface is introduced into the optical path of the output beam.

5. The laser projection system of claim 1, wherein the speckle reduction diffusing surface provides a substantially homogeneous angular energy distribution of the output beam.

6. The laser projection system of claim 1, wherein the speckle reduction diffusing surface is configured such that an angular energy distribution of the output beam provided by the speckle reduction diffusing surface is a grid comprising a plurality of points.

7. The laser projection system of claim 1, wherein the speckle reduction diffusing surface is configured such that an angular energy distribution of the output beam provided by the speckle reduction diffusing surface is a ring-shaped emission profile.

8. The laser projection system of claim 1, wherein the speckle reduction diffusing surface is configured as a diffraction optical element.

9. The laser projection system of claim 1, wherein the speckle reduction diffusing surface is configured as a computer generated hologram.

10. The laser projection system of claim 1, wherein:
the light source comprises a plurality of lasers, each laser emitting an output beam having a different wavelength; and
the focusing component is configured to focus each output beam at a plurality of first focused points prior to the optical scanning component such that the first focused points are spatially separated.

11. The laser projection system of claim 10, wherein the speckle reduction diffusing surface comprises a plurality of spatially separated regions having different diffusion properties, the spatially separated regions being configured to align with the first focused points.

12. The laser projection system of claim 11, wherein at least one of the spatially separated regions has a diffusion property that is substantially transparent.

13. The laser projection system of claim 12, wherein:
at least one of the lasers is configured to emit an output beam having a wavelength in the blue or red spectral range; and
the speckle reduction diffusing surface is arranged such that spatially separated region having a substantially transparent diffusion property is aligned with the output beam having a wavelength in the blue or red spectral range.

14. The laser projection system of claim 10, wherein the laser projection system is further programmed to introduce a time delay on a control signal applied to one or more of the lasers to compensate for a spatial separation of a plurality of second focused points on the projection surface.

15. The laser projection system of claim 1, wherein a focal length of the optical collimating component is adjustable.

16. The laser projection system of claim 15, wherein the optical collimating component comprises a liquid lens and is operable to vary a focus of the second focused point on the projection surface in accordance with a projection distance of the laser projection system to the projection surface.

17. The laser projection system of claim 15, wherein:
the speckle reduction diffusing surface is orientated at a focusing angle with respect to an axis that is perpendicular to an optical axis defined by the optical path of the output beam; and
the laser projection system is further programmed to translate the speckle reduction diffusing surface along a first axis perpendicular to the optical path such that the first focused point is imaged at the second focused point at the projection surface.

18. The laser projection system of claim 1, wherein:
the speckle reduction diffusing surface produces a diffusing angle of the output beam such that the output beam has a diameter that is greater than about 3 mm;
the laser projection system further comprises a polarization scrambling device that is introduced into the optical path of the output beam; and
the polarization scrambling device is operable to modulate a polarization state of the output beam.

19. The laser projection system of claim 18, wherein the polarization scrambling device comprises a polarization split and delay unit.

20. The laser projection system of claim 18, wherein the polarization scrambling device comprises a liquid crystal modulator operable to vary the polarization state between two orthogonal polarization states at an frame rate.

21. The laser projection system of claim 1, wherein:
the speckle reduction diffusing surface produces a diffusing angle of the output beam such that the output beam has a diameter that is greater than about 1.5 mm;
the laser projection system further comprises a polarization scrambling device that is introduced into the optical path of the output beam and is operable to modulate a polarization state of the output beam; and
a spectral width of at least one of the at least one laser is greater than about 0.6 nm.

22. The laser projection system of claim 1, wherein the laser projection system is further programmed to operate in an infinite depth of focus mode or in a speckle reduction mode, and to control the light source such that a power emitted by the light source is such that the laser projection system operates as a class 2 laser in the infinite depth of focus mode or the speckle reduction mode.

23. A laser projection system comprising a light source, an optical scanning component, a focusing component, a speckle reduction diffusing surface, and an optical collimating component, wherein:
the light source comprises at least one laser configured to emit an output beam;
the focusing component is positioned in an optical path of the output beam emitted by the light source and focuses the output beam at a first focused point located prior to the optical scanning component;
the speckle reduction diffusing surface is operable to be introduced into the optical path of the output beam at the first focused point prior to the optical scanning component during a speckle reduction mode of operation, and operable to be removed from the optical path of the output beam during an infinite depth of focus mode of operation;
the speckle reduction diffusing surface is orientated at a focusing angle with respect an axis that is perpendicular to an optical axis defined by the optical path of the output beam;
the optical collimating component is positioned in the optical path of the output beam after the focusing component and is operable to at least nearly collimate the output beam onto the optical scanning component;
the speckle reduction diffusing surface produces a diffusing angle of the output beam such that the output beam has a diameter between about 1.5 mm to about 4 mm on the optical scanning component when the speckle reduction diffusing surface is introduced into the optical path of the output beam;

the focusing component and the optical collimating component are configured such that a diameter of the output beam on the optical scanning component is between about 0.4 mm to about 1 mm when the speckle reduction diffusing surface is not introduced into the optical path of the output beam; and the laser projection system is programmed to generate at least a portion of a scanned laser image on a projection surface by operating the laser for optical emission of encoded image data and controlling the optical scanning component to scan the output beam across a plurality of image pixels, and translate the speckle reduction diffusing surface in a direction along a first axis that is perpendicular to the optical path such that the first focused point is imaged at a second focused point at the projection surface.

* * * * *